Patented Mar. 1, 1932

1,847,650

UNITED STATES PATENT OFFICE

CARL IMMERHEISER, OF LEHNITZ, NEAR ORANIENBURG, AND BODO ZSCHIMMER, MARTIN FRITSCH, AND HANNS FLEISCHMANN, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

PRODUCTION OF AZO DYESTUFFS AND COLOR LAKES THEREOF

No Drawing. Application filed March 20, 1930, Serial No. 437,594, and in Germany July 23, 1925.

The present invention relates to the production of azo dyetuffs and color lakes thereof in a particularly fine dispersion.

This application is a continuation in part of our copending application Serial No. 103,967, filed April 22, 1926.

We have found that azo dyestuffs and lakes thereof, which hereinafter are referred to as azo coloring matters, are obtained in a state of particularly fine distribution by effecting the production of said azo coloring matters in the presence of an inert aromatic sulphonic acid, in which at least one hydrogen atom in the nucleus is substituted by a hydrocarbon side chain. The said aromatic sulphonic acids do not interfere with the production of the azo coloring matters, which is carried out by the usual methods. The said aromatic sulphonic acids are preferably added to one of the dissolved components to which the other reacting component is then added. For example, in the production of azo dyestuffs, the aromatic sulphonic acid is added to a solution of the coupling component, the solution of the diazo compound then being added, or the aromatic sulphonic acid is added to a solution of an azo dyestuff, the color lake of which is then precipitated by the addition of an alkaline earth metal salt. By the addition of the said aromatic sulphonic acids the azo coloring matters are obtained in a state of extremely fine dispersion and therefore possess a high coloring power.

Among the aromatic sulphonic acids, which may be used either as free acids or in the form of their salts, those containing a hydrocarbon side chain of at least two carbon atoms are particularly suitable. The side chains may be open, for example ethyl, propyl, butyl, or other radicals, or rings as for instance in the sulphonic acids substituted by cyclohexyl and similar radicals, or they may link together two hydrocarbon residues; the sulphonic acids may contain one or several such side chains. The presence of alkylated amino groups as substituents also proves to be very efficient. We mention as examples of compounds especially suitable for the said purposes: propyl and butyl derivatives of naphthalene sulphonic acids; also dimethyl metanilic acid, diamyl-alpha-naphthylamine sulphonic acid and similar compounds, or their salts. Condensation products of sulphonated phenols or naphthalene and formaldehyde may also be used. The efficiency of the said aromatic sulphonic acids is further increased when employing them in conjunction with Turkey red oil or similar sulphonated oils.

The following examples will further illustrate how our invention may be carried out in practice, but the invention is not limited to these examples. The parts are by weight.

Example 1

15 parts of beta-naphthol are dissolved in 500 parts of water with an addition of 13 parts of caustic soda lye of 40 Bé. and 10 parts of soda ash. 10 parts of iso-propylated naphthalene sulphonic acid sodium salt dissolved in 50 parts of water are added to this solution and a solution of the diazo compound prepared in the usual manner from 13.8 parts of p-nitraniline is then caused to run in. The coloring matter separates in a much finer state of division than when obtained in the absence of a sulphonic acid salt or in the presence of Turkey red oil.

Example 2

20 parts of barium sulphate are made into a paste with a solution of 10 parts of aluminium sulphate in 100 parts of water, a solution of 5 parts of calcined soda, 50 parts of water then being run in whereby aluminium hydroxide is precipitated. A solution of 5 parts of the sodium salt of diisopropylnaphthalene sulphonic acid in 50 parts of water, and then 4 parts of Ponceau RR (see Colour Index No. 79), dissolved in 40 parts of water, are added to the said substratum, the color lake being then precipitated by the addition of 16 parts of crystalline barium chloride in 160 parts of water.

The color lake thus produced is worked up as usual. Wall paper is stained by the said color lake purer and more vivid shades than by the same color lake produced in the absence of the sodium salt of diisopropylnaphthalene sulphonic acid.

In the appended claims the sulphonic acids and their salts which are added according to the present invention are referred to as being "inert", which is to mean that they do not chemically take part in the reaction by interaction with the diazonium compounds used or with the coupling components or with the chemicals serving for the precipitation of color lakes. As is well known naphthalene sulphonic acids are capable of coupling with diazonium compounds only when they contain at least one hydroxyl or amino group (see for example E. J. van der Kam, Die Naphtalinderivate, published in 1927 at The Hague, vol. 1, page XVIII), and such naphthalene sulphonic acids capable of coupling with diazonium compounds are accordingly not included within the scope of the present invention.

What we claim is:—

1. In the production of azo coloring matters the step, which comprises producing an azo coloring matter in the presence of an inert naphthalene sulphonic acid, in which at least one hydrogen atom in the nucleus is substituted by a hydrocarbon side chain.

2. In the production of azo coloring matters the step, which comprises adding an inert naphthalene sulphonic acid, in which at least one hydrogen atom in the nucleus is substituted by a hydrocarbon side chain, to at least one of the dissolved components reacting with each other to form an azo coloring matter.

3. In the production of color lakes of azo dyestuffs the step, which comprises producing a color lake of an azo dyestuff in the presence of an inert naphthalene sulphonic acid, in which at least one hydrogen atom in the nucleus is substituted by a hydrocarbon side chain.

4. In the production of azo coloring matters the step, which comprises adding an inert naphthalene sulphonic acid, in which at least one hydrogen atom in the nucleus is substituted by a hydrocarbon side chain, to the dissolved azo dyestuff and producing the color lake by the addition of a compound of a metal capable of forming a lake with the azo dyestuff.

5. In the production of azo coloring matters the step, which comprises producing an azo coloring matter in the presence of an inert naphthalene sulphonic acid, in which at least one hydrogen atom is substituted by a hydrocarbon side chain containing at least two carbon atoms.

In testimony whereof we have hereunto set our hands.

CARL IMMERHEISER.
BODO ZSCHIMMER.
MARTIN FRITSCH.
HANNS FLEISCHMANN.